US012367319B2

(12) United States Patent
Bertin et al.

(10) Patent No.: US 12,367,319 B2
(45) Date of Patent: Jul. 22, 2025

(54) METHOD AND DEVICE FOR CONTROLLING ACCESS TO A FUNCTION OF AN APPLICATION REGISTERED IN A BLOCKCHAIN

(71) Applicant: Orange, Issy-les-Moulineaux (FR)

(72) Inventors: Emmanuel Bertin, Chatillon (FR); Julien Hatin, Chatillon (FR); Baptiste Hemery, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 215 days.

(21) Appl. No.: 17/800,707

(22) PCT Filed: Feb. 17, 2021

(86) PCT No.: PCT/FR2021/050276
§ 371 (c)(1),
(2) Date: Aug. 18, 2022

(87) PCT Pub. No.: WO2021/165612
PCT Pub. Date: Aug. 26, 2021

(65) Prior Publication Data
US 2023/0177214 A1    Jun. 8, 2023

(30) Foreign Application Priority Data
Feb. 19, 2020  (FR) ..................... 2001661

(51) Int. Cl.
*G06F 21/62*    (2013.01)
(52) U.S. Cl.
CPC ................. *G06F 21/629* (2013.01)

(58) Field of Classification Search
CPC ................................... G06F 21/629
See application file for complete search history.

(56) References Cited

U.S. PATENT DOCUMENTS 10,277,398 B2 *  4/2019  Weimer ............... H04L 9/3236
10,325,079 B1 *  6/2019  Vukich ................ G06F 21/121
(Continued)

OTHER PUBLICATIONS

English translation of the Written Opinion of the International Searching Authority dated Jun. 1, 2021 for corresponding International Application No. PCT/FR2021/050276, filed Feb. 17, 2021.
(Continued)

*Primary Examiner* — Viral S Lakhia
(74) *Attorney, Agent, or Firm* — David D. Brush; Westman, Champlin & Koehler, P.A.

(57) ABSTRACT

A method for controlling access to a function of an application implemented by a device for controlling access to a function of an application. The control device is registered to a blockchain. The method includes: of receiving, from a first terminal, a first request to access at least one first function of the application, the application being registered in the blockchain, the request including at least one first identifier of the at least one first function and at least one identifier of the first terminal; and transmitting a response to the access request including at least one parameter for accessing the at least one first function and at least one second identifier of at least one second function registered in the blockchain, the at least one second identifier being associated with the at least one parameter.

12 Claims, 2 Drawing Sheets

(56) References Cited

U.S. PATENT DOCUMENTS

| | | | |
|---|---|---|---|
| 10,958,421 B2* | 3/2021 | Yoon | H04L 63/10 |
| 11,030,297 B2* | 6/2021 | Antar | H04L 9/3239 |
| 11,132,460 B2* | 9/2021 | Chen | H04L 9/0643 |
| 11,334,874 B2* | 5/2022 | Snow | G06Q 20/065 |
| 11,416,864 B2* | 8/2022 | Mokhasi | G06Q 20/4016 |
| 11,520,912 B2* | 12/2022 | Chen | G06F 21/62 |
| 11,531,783 B2* | 12/2022 | Hamel | H04L 63/102 |
| 11,544,708 B2* | 1/2023 | Gonzales, Jr. | G06F 21/602 |
| 11,734,616 B2* | 8/2023 | Narang | G06Q 10/02 |
| | | | 705/51 |
| 2018/0167394 A1* | 6/2018 | High | H04L 63/123 |
| 2019/0244294 A1* | 8/2019 | Shao | G06F 8/70 |
| 2019/0372834 A1* | 12/2019 | Patil | H04W 8/04 |
| 2020/0020440 A1* | 1/2020 | Beinhauer | H04L 67/02 |
| 2020/0045019 A1* | 2/2020 | Huang | H04L 63/062 |
| 2020/0099513 A1* | 3/2020 | Angelo | H04L 63/12 |
| 2020/0175155 A1* | 6/2020 | Bhamidipati | G06Q 20/405 |
| 2020/0244634 A1* | 7/2020 | Benavides | H04L 9/3239 |
| 2020/0342092 A1* | 10/2020 | Wei | G06F 21/6218 |
| 2022/0052988 A1* | 2/2022 | Gadnis | H04L 67/1097 |

OTHER PUBLICATIONS

Wikipedia contributors, "Blockchain", Wikipedia, The Free Encyclopedia, Aug. 15, 2022, Retrieved from the Internet on Aug. 24, 2022.

International Search Report dated May 24, 2021 for corresponding International Application No. PCT/FR2021/050276, filed Feb. 17, 2021.

Written Opinion of the International Searching Authority dated May 24, 2021 for corresponding International Application No. PCT/FR2021/050276, filed Feb. 17, 2021.

Liu Haiqing et al, "Electric Vehicle Power Trading Mechanism Based on Blockchain and Smart Contract in V2G Network", IEEE Access, vol. 7, Nov. 8, 2019 (Nov. 8, 2019), p. 160546-160558, XP011754204.

Knirsch Fabian et al, "Privacy-preserving blockchain-based electric vehicle charging with dynamic tariff decisions", Sep. 4, 2017 (Sep. 4, 2017), vol. 33, No. 1, p. 71-79, XP036392932.

* cited by examiner

METHOD AND DEVICE FOR CONTROLLING ACCESS TO A FUNCTION OF AN APPLICATION REGISTERED IN A BLOCKCHAIN

CROSS-REFERENCE TO RELATED APPLICATIONS

This Application is a Section 371 National Stage Application of International Application No. PCT/FR2021/050276, filed Feb. 17, 2021, which is incorporated by reference in its entirety and published as WO 2021/165612 A1 on Aug. 26, 2021, not in English.

1. FIELD OF THE INVENTION

The invention relates to the general field of telecommunications networks, and more precisely to blockchain technology.

2. PRIOR ART

Conventionally, blockchains manage crypto-currencies (currency issued peer-to-peer without the intervention of a central bank). Mention may for example be made of the decentralized electronic money Bitcoin, which was created in 2009. However, new types of blockchains with a wider scope of application have emerged. This is for example the case of Ethereum, which allows the registration of decentralized applications (DApps). Concretely, each decentralized application present within the blockchain is composed of a binary code and of an interface providing methods that may be called, for example by a third party or by other applications. A DApp also has a private data zone that it is able to modify depending on the processing operations carried out.

The business model of such a blockchain essentially hinges on the act of deploying the application. It is necessary to "pay" to deploy the application, i.e. to reimburse the people who validate the application and who create the block associated with the validation in the blockchain. In addition, anyone who wishes to use the application, for example via a sent request to perform a particular task, must also pay for each use, the payment required being set by a predetermined algorithm.

However, it is not currently possible, when a third party wishes to use a decentralized application, to adapt and personalize the remuneration of the supplier of the application depending on its use. Specifically, these remuneration methods are still very simple and do not allow a supplier to establish rules of use of its decentralized applications with associated costs.

3. SUMMARY OF THE INVENTION

The invention aims to improve the prior art and provides a method for controlling access to a function of an application, said method being implemented by a device for controlling access to a function of an application, this control device being registered in a blockchain, the method being characterized in that it comprises:

a step of receiving, from a first terminal, a first request to access at least a first function of the application, said application being registered in said blockchain, said request comprising at least a first identifier of said at least a first function and at least one identifier of said first terminal;

a step of sending a response to the access request comprising at least one access parameter of said at least a first function and at least a second identifier of at least a second function registered in said blockchain, said at least a second identifier being associated with said at least one parameter.

Thus, the invention makes provision to use a blockchain to manage access to an application registered in a blockchain and more precisely to its one or more functions. The present patent application is presented in the context of a "blockchain", but the expression "blockchain" is to be understood to cover any type of distributed ledger technology (DLT) able to host decentralized applications (DApps), the blockchains of which are actually just one particular element.

It will be recalled, as indicated in the document (https://en.wikipedia.org/wiki/Blockchain), that blockchain technology is a technology for storing and transmitting information without central control. Technically, a blockchain is a distributed database, the information of which is submitted by users, and links internal to the database are verified and grouped at regular time intervals into blocks, all of these being secured by cryptography, and thus forming a chain. By extension, a blockchain is a distributed database that manages a list of records protected against tampering or modification by storage nodes; it is therefore a distributed and secure register of all the transactions carried out since the start of the system. Blockchains are especially characterized in that their contents cannot be modified or deleted: information published (i.e. recorded or saved) in a blockchain remains so forever.

From a practical point of view, the invention offers a new mechanism whereby, when a request to access a function of an application registered in a blockchain is sent by a user terminal, the device executing the access control method returns a response with an access parameter associated with the function, such as, for example, a tariff option, and an identifier of a second function, such as a payment function associated with the option.

Advantageously, this embodiment makes it possible to specify to a user the conditions of access and of use of a function registered in a blockchain.

By function, what is meant is a segment of computer code representing a program subroutine, which performs a particular task or computation. The identifier of the function is for example the name given thereto by the programmer on its creation, or the signature of the function including some parameters.

By identifier of a terminal, what is meant is a sequence of characters that allows the terminal to be uniquely identified, such as a MAC address, an IP address, a serial number (e.g. an IMEI) or a cryptographic key. Alternatively, the identifier of the terminal may also be an identifier of the user, said identifier being entered by the user via a user interface, such as a graphical or voice interface, of the terminal and allowing the user of the terminal to be uniquely identified. The identifier may for example be an e-mail address, an identity card number, a subscriber number, etc.

According to one particular embodiment of the invention, a method such as described above is characterized in that the sending step is followed by a first step of publishing, in said blockchain, said identifier of said first terminal, at least one datum associated with the receiving step and at least one datum associated with the sending step.

This publication is submitted to the blockchain in order to store and share information related to the receiving and sending steps, such as the date and time at which requests were received and sent, and received or sent elements such as, for example, the identifier of the terminal, or even the result of a processing operation carried out by the device.

According to one particular embodiment of the invention, a method such as described above is characterized in that the sending step is followed:
- by a second step of receiving, from at least a second terminal, a request to execute said at least a second function, said execution request comprising at least said identifier of said first terminal;
- by a step of executing said at least a second function;
- by a second step of publishing, in the blockchain, via what is called a payment publication, said identifier of said first terminal, at least one datum associated with said second receiving step and at least one datum associated with the result of the execution of said at least a second function.

Advantageously, this embodiment allows the user to execute the second function, which for example is a function such as a payment function allowing the first function to be used. A publication is also submitted to the blockchain in order to store and share the result of the execution of the second function. The published information may for example be the status of a payment, information related to the request to execute the second function (such as the identifier of the terminal and/or of the user) or indeed any other information associated with the execution of the second function.

According to a first variant of this particular embodiment of the invention, a method such as described above is characterized in that the second publishing step is followed by a second step of sending a response to the execution request comprising at least one datum associated with the result of the execution of said at least a second function.

Advantageously, this embodiment allows the user to obtain information on the execution of the second function and its result. In the case where the second function is a payment function, the user will thus obtain, for example, information on the status of the payment (accepted, refused or pending) or its transaction number.

According to a second variant of this particular embodiment of the invention, a method such as described above is characterized in that the second publishing step is followed:
- by a third step of receiving, from said application, a request to authorize use by said first terminal of said at least a first function, said authorization request comprising at least said identifier of said first terminal and at least said first identifier of said at least a first function;
- by a step of obtaining, from said blockchain, depending on said identifier of said first terminal, data published via said payment publication;
- by a third step of sending a response to the authorization request comprising at least a second access parameter of said at least a first function, said access parameter being dependent on the result of the execution of said at least a second function, which result is obtained via the data of said payment publication;
- by a third step of publishing, in the blockchain, said at least a second access parameter and the identifier of said first terminal.

Advantageously, this embodiment makes it possible to verify that the user indeed has the right to access the first function. The application will thus verify that the second function has indeed been executed by the terminal of the user and that the result is indeed in accordance with what is expected. For example, the application will verify that a payment has indeed been made by the user (execution of the second function) and that the payment has been validated (compliant result) before giving access to the first function.

A method for controlling execution of a function of an application is implemented by a device for controlling execution of a function of an application, this control device being registered in a blockchain, the method being characterized in that it comprises:
- a step of receiving, from a terminal, a first request to execute at least a first function of an application registered in said blockchain, said request comprising at least a first identifier of said at least a first function and at least one identifier of said terminal;
- a step of sending a response to the execution request comprising at least a second identifier of at least a second function registered in said blockchain.

Advantageously, this embodiment makes it possible, when a first request to execute a first function of an application registered in a blockchain is sent by a user terminal, to return a response with an identifier of a second function, such as for example a function that will allow additional information on the first function to be provided to the user.

According to one particular embodiment of the invention, a method for controlling execution of a function of an application such as described above is characterized in that the sending step is followed by a first step of publishing, in the blockchain, said identifier of said terminal, at least one datum associated with the receiving step and at least one datum associated with the sending step.

This publication is submitted to the blockchain following the step of sending the response to the execution request in order to store and share information related to the receiving and sending steps, such as the date and time at which requests were received and sent, and received or sent elements such as, for example, the identifier of the terminal, or even the result of a processing operation carried out by the device.

According to one particular embodiment of the invention, a method for controlling the execution of a function of an application such as described above is characterized in that the sending step is followed:
- by a second step of receiving, from said terminal, a second request to execute said at least a first function, said second execution request comprising at least said first identifier of said at least a first function and at least said identifier of said terminal;
- by a second step of sending a request for said terminal to be authorized to execute said at least a first function, said authorization request comprising at least said identifier of said terminal and at least said first identifier of said at least a first function;
- by a third step of receiving a response to the authorization request comprising at least one access parameter of said at least a first function for said terminal;
- by a step of executing said at least a first function depending on said at least one received access parameter;
- by a second step of publishing, in the blockchain, said at least one access parameter, said identifier of said terminal and at least one datum associated with the result of the execution of said at least a first function.

Advantageously, this embodiment makes it possible, when a second request to execute a first function of an application registered in a blockchain is sent by a user terminal, to send a request asking for the user terminal to be authorized to use the first function and for it to obtain in return an access parameter thereto. Execution of the function is then dependent on the access parameter.

A publication is also submitted to the blockchain in order to store and share information related to the receiving, sending and executing steps, such as the date and time at which requests were received and sent, and received or sent elements such as, for example, the access parameter, or even the result of a processing operation carried out by the device.

According to one particular embodiment of the invention, a method for controlling execution of a function of an application such as described above is characterized in that the second publishing step is followed by a third step of sending a response to the second execution request comprising at least one datum associated with the result of the execution of said at least a first function.

Advantageously, this embodiment allows the user to obtain information on the execution of the first function and its result.

The invention also relates to a device for controlling access to a function of an application, said control device being registered in a blockchain and comprising:
  a module for receiving, from a first terminal, a first request to access at least a first function of the application, said application being registered in said blockchain, said request comprising at least a first identifier of said at least a first function and at least one identifier of said first terminal;
  a module for sending a response to the access request comprising at least one access parameter of said at least a first function and at least a second identifier of at least a second function registered in said blockchain, said at least a second identifier being associated with said at least one parameter;
  a module for publishing, in said blockchain, said identifier of said first terminal, at least one datum associated with the receiving step and at least one datum associated with the sending step.

According to one particular embodiment of the invention, a device for controlling access to a function of an application such as described above is characterized in that it further comprises:
  a second module for receiving, from at least a second terminal, a request to execute said at least a second function, said execution request comprising at least said identifier of said first terminal;
  a module for executing said at least a second function;
  a second module for publishing, in the blockchain, via what is called a payment publication, said identifier of said first terminal, at least one datum associated with said second receiving step and at least one datum associated with the result of the execution of said at least a second function.

According to one particular embodiment of the invention, a device for controlling access to a function of an application such as described above is characterized in that it further comprises:
  a third module for receiving a request to authorize use by said first terminal of said at least a first function, said request originating from said application and comprising at least said identifier of said first terminal and at least said first identifier of said at least a first function;
  a module for obtaining, from said blockchain, depending on said identifier of said first terminal, data published via said payment publication;
  a third module for sending a response to the authorization request comprising at least a second access parameter of said at least a first function, said access parameter being dependent on the result of the execution of said at least a second function, which result is obtained from the data of said payment publication;
  a third module for publishing, in the blockchain, said at least a second access parameter and said identifier of said first terminal.

The invention also relates to a device for controlling execution of a function of an application, said control device being registered in a blockchain and comprising:
  a module for receiving, from a terminal, a first request to execute at least a first function of an application registered in said blockchain, said request comprising at least a first identifier of said at least a first function and at least one identifier of said terminal;
  a module for sending a response to the execution request comprising at least a second identifier of at least a second function registered in said blockchain;
  a module for publishing, in a blockchain, said identifier of said terminal, at least one datum associated with the receiving step and at least one datum associated with the sending step.

According to one particular embodiment of the invention, a device for controlling execution of a function of an application such as described above is characterized in that it further comprises:
  a second module for receiving, from said terminal, a second request to execute said at least a first function, said second execution request comprising at least said first identifier of said at least a first function and at least said identifier of said terminal;
  a second module for sending a request for said terminal to be authorized to execute said at least a first function, said authorization request comprising at least said identifier of said terminal and at least said first identifier of said at least a first function;
  a third module for receiving a response to the authorization request comprising at least one access parameter of said at least a first function for said terminal;
  a module for executing said at least a first function depending on said at least one received access parameter;
  a second module for publishing, in the blockchain, said at least one access parameter, said identifier of said terminal, and at least one datum associated with the result of the execution of said at least a first function.

The term module may correspond equally to a software component or to a hardware component or to a set of software and hardware components, a software component itself corresponding to one or more computer programs or subroutines or, more generally, to any element of a program able to implement a function or a set of functions such as described for the modules in question. In the same way, a hardware component corresponds to any element of a hardware assembly able to implement a function or a set of functions for the module in question (integrated circuit, chip card, memory card, etc.).

The invention also relates to a computer program comprising instructions for implementing any one of the methods defined above according to any one of the particular embodiments described above, when said program is executed by a processor. The method may be implemented in various ways, in particular in hard-wired form or in the form of software. This program may use any programming language and be in the form of source code, object code or intermediate code between source code and object code, such as in a partially compiled form, or in any other desirable form.

The invention also targets a computer-readable storage medium or data medium containing instructions of a computer program such as mentioned above. The abovementioned storage media may be any entity or device capable of storing the program. For example, the medium may comprise a storage means, such as a ROM, for example a CD-ROM or a microelectronic circuit ROM, or else a magnetic storage means, for example a hard disk.

Moreover, the storage media may correspond to a transmissible medium such as an electrical or optical signal, which may be routed via an electrical or optical cable, by radio or by other means. The programs according to the invention may in particular be downloaded from the Internet.

As an alternative, the storage media may correspond to an integrated circuit in which the program is incorporated, the circuit being designed to execute or to be used in the execution of the method in question.

These devices for controlling access to a function of an application, for controlling the execution of a function of an application and these computer programs have features and advantages analogous to those described above in relation to the methods for controlling access to a function of an application and for controlling execution of a function of an application.

4. LIST OF FIGURES

Other features and advantages of the invention will become more clearly apparent on reading the following description of particular embodiments, which are given by way of simple illustrative and non-limiting examples, and the appended drawings, in which.

5. DESCRIPTION OF ONE EMBODIMENT OF THE INVENTION

Figure 1:
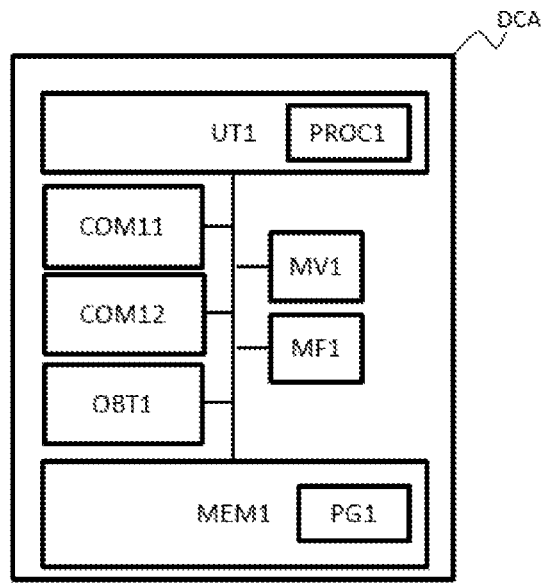
FIG. 1 shows the hardware architecture of a device for controlling access to a function according to one particular embodiment.

FIG. 1 shows the hardware architecture of a device DCA for controlling access to a function in accordance with the invention. In the embodiment described here, this device has the hardware architecture of a computer. It especially comprises a processor PROC1, a random-access memory MV1, a read-only memory MEM1 and a non-volatile flash memory MF1. Such means are known per se and are not described in more detail here. The read-only memory is a storage medium according to the invention, which is readable by the processor PROC1 and on which is here stored a computer program PG1 according to the invention, this program comprising instructions for implementing the steps of the method for controlling access to a function such as described above, when the program is executed by the processor PROC1.

On initialization, the code instructions of the computer program PG1 are for example loaded into a memory, before being executed by the processor PROC1. The processor PROC1 of the processing unit UT1 especially implements the steps of the method for controlling access to a function according to any one of the particular embodiments described with reference to FIG. 3, according to the instructions of the computer program PG1.

The device DCA also comprises communication modules COM11 and COM12 configured to set up communications with, for example, a circuit and/or IP network. The communication module COM11 is used to receive requests to access a first function from a terminal, and the module COM12 to send a response comprising access parameters and an identifier of a second function associated with the first function. The device DCA further comprises a module OBT1 able to publish, in the blockchain, data related to the receiving and sending steps of the method for controlling access to a function.

According to one particular embodiment of the invention, the modules COM11 and COM12 may be one and the same communication module (COM1).

According to one particular embodiment of the invention, the module COM1 is also able to receive requests to execute the second function and the module OBT1 is able to publish, in the blockchain, data related to the step of receiving an execution request and to its execution. The second function may be executed by the device DCA and its processor PROC1 or via a dedicated module (not shown here).

According to one particular embodiment of the invention, the module COM1 may also be used to send a response to the execution request with data relating to the result of the execution of the second function.

According to one particular embodiment of the invention, the module COM1 may in addition receive requests asking for authorization in respect of use of the first function, and send a response comprising a second access parameter dependent on a publication obtained from the blockchain via the module OBT1. The module OBT1 may in addition publish, in the blockchain, data such as the second parameter, an identifier of the terminal or any other datum relating to the data received and sent by the module COM1.

It will be noted that, in the embodiment described above, the requests received and sent by the device DCA are handled by the module COM1. Alternatively, the device DCA may comprise a plurality of communication modules allowing requests to be received and/or sent.

Likewise, in the embodiment described above, the module OBT1 manages all the publications submitted to the blockchain. Alternatively, the device DCA may comprise a plurality of publication modules allowing publications to be published in and/or obtained from the blockchain.

Figure 2:
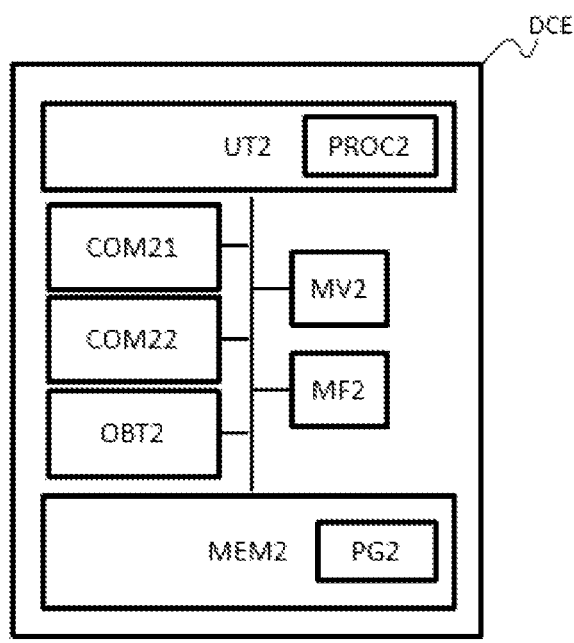
FIG. 2 shows the hardware architecture of a device for controlling execution of a function according to one particular embodiment.

FIG. 2 shows the hardware architecture of a device DCE for controlling execution of a function in accordance with the invention. In the embodiment described here, this device has the hardware architecture of a computer. It especially comprises a processor PROC2, a random-access memory MV2, a read-only memory MEM2 and a non-volatile flash memory MF2. Such means are known per se and are not described in more detail here. The read-only memory is a storage medium according to the invention, which is readable by the processor PROC2 and on which is here stored a computer program PG2 according to the invention, this program comprising instructions for implementing the steps of the method for controlling execution of a function such as described above, when the program is executed by the processor PROC2.

On initialization, the code instructions of the computer program PG2 are for example loaded into a memory, before being executed by the processor PROC2. The processor PROC2 of the processing unit UT2 especially implements the steps of the method for controlling execution of a function according to any one of the particular embodiments described with reference to FIG. 3, according to the instructions of the computer program PG2.

The device DCE also comprises communication modules COM21 and COM22 configured to set up communications with, for example, a circuit and/or IP network. The communication module COM21 is used to receive requests to execute a first function from a terminal, and the module COM22 to send a response comprising an identifier of a second function registered in a blockchain. It will be noted that the response may also comprise network parameters.

The device DCE further comprises a module OBT2 able to publish, in the blockchain, data related to the receiving and sending steps of the method for controlling execution of a function.

According to one particular embodiment of the invention, the modules COM21 and COM22 may be one and the same communication module (COM2).

According to one particular embodiment of the invention, the module COM2 is also able to send a request to authorize use of the first function by the terminal, and to receive a response comprising an access parameter of the first function. The module OBT2 may also be used to publish, in the blockchain, data related to the step of sending the request to authorize use, and to its execution dependent on an access parameter received in response to the request to authorize use. The first function may be executed by the device DCE and its processor PROC2 or via a dedicated module (not shown here).

According to one particular embodiment of the invention, the module COM2 may also send, to the terminal, a response to the execution request, the response possibly comprising a datum associated with the result of the execution of the first function. The module OBT2 may also publish, in the blockchain, data such as the result of the execution of the first function, an identifier of the terminal or any other datum relating to the data received and sent by the module COM2.

It will be noted that, in the embodiment described above, the requests received and sent by the device DCE are handled by the module COM2. Alternatively, the device DCE may comprise a plurality of communication modules allowing requests to be received and/or sent.

Likewise, in the embodiment described above, the module OBT2 manages all the publications submitted to the blockchain. Alternatively, the device DCE may comprise a plurality of publication modules allowing publications to be published in and/or obtained from the blockchain.

Figure 3:
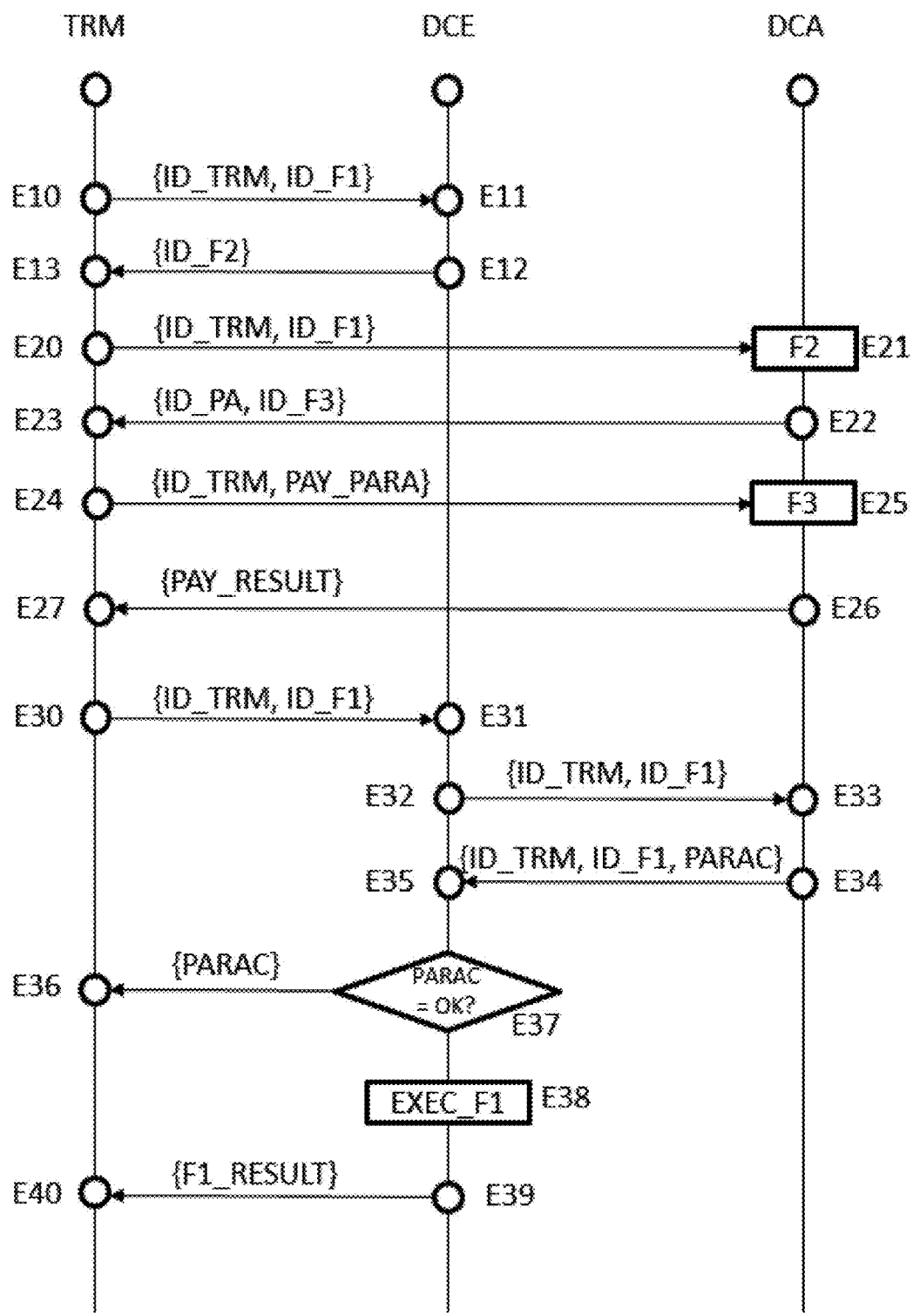
FIG. 3 shows, in the form of a flowchart, the main steps of a method for controlling access to a function and the main steps of a method for controlling execution of a function in accordance with embodiments of the invention.

With reference to FIG. 3, the following will now be described:
the main steps E21, E22, E25, E26, E33 and E34 of a method for controlling access to a function of an application;
the main steps E11, E12, E31, E32, E35, E37, E38 and E39 of a method for controlling execution of a function of an application.

FIG. 3 shows a terminal TRM, such as for example a mobile terminal or a computer able to send and receive requests to and from a blockchain, and devices DCE and DCA registered in a blockchain and able to execute decentralized functions or DApps in the sense of blockchain technology. These applications take the form of an executable code. In the case described with reference to FIG. 3, the device DCE executes a DApp comprising a function F1 and the device DCA executes a DApp comprising the functions F2 and F3.

In a first step E10, the terminal TRM sends a request to execute the function F1 of the DApp to the device DCE. The request for example comprises the identifier of the sender terminal and the identifier of the function F1. The request may also comprise other data such as tokens, cryptographic keys, which for example allow the device DCE to authenticate the terminal TRM, or a user identifier that was entered beforehand by the user into the terminal TRM via for example a dedicated user interface such as a voice or graphical interface. Of course it is assumed that the terminal TRM and its user are already known and registered in the blockchain.

Upon receipt of the request (E11), the device DCE will process the request and generate a response comprising an identifier of a second function F2. The device DCE will then send this response (E12) to the terminal TRM. Concretely, the device DCE redirects to a function F2 of a DApp executed by the device DCA. The device DCE may also publish, in the blockchain, information related to the receiving and sending steps, such as the date and time at which requests were received and sent, and received or sent elements such as, for example, the identifier of the terminal, or even the result of a processing operation carried out by the device.

Once the response to its first request has been received (E13), the terminal TRM will generate a request to execute the function F2, which request is intended for the device DCA.

In step E20, the request is sent with, for example, the same data as the first request sent by the terminal TRM in step E10. The request is then received, in step E21, by the device DCA, which will execute the function F2. The result of the function F2 is, for example, a list of data pairs, the first datum of each pair being an identifier or a character string indicating a tariff option (ID_PA) associated with the execution of the function F1, and the second datum being an identifier of a third function (ID_F3) associated with the tariff option. The result of the execution of the function F2 is next sent by the device DCA (E22) then received by the terminal TRM in step E23.

The device DCA may also publish, in the blockchain, information related to the receiving and sending steps, such as the date and time at which requests were received and sent, and received or sent elements such as, for example, the identifier of the terminal, information on execution of the function F2, or even the result of the function F2. This publication is called "tariff publication".

Alternatively, in step E21, the device DCA may not need to execute the function F2. This is for example the case if the list is static, i.e. if the tariff options will remain the same for a fairly long period of time (e.g.: 1 week, 1 month, 1 year, etc.).

According to one particular embodiment of the invention, a tariff option may be associated with execution of a function, F1 for example, or with a plurality of functions (F11, F12, . . . , F1n).

According to one particular embodiment of the invention, a tariff option may be dependent on the identifier of the terminal. This is for example the case when a price of execution of the function F1 is negotiated by a company for its employees.

According to one particular embodiment of the invention, a tariff option may be associated with a period of validity.

The user of the terminal TRM will then choose a tariff option from the list depending on their needs. The tariff option chosen will allow the execution framework of the function F1 to be specified for the terminal TRM and its user. The tariff options may, for example, define:

a price depending on an execution quota of the function F1;

a price depending on a time slot during which it is possible to execute the function F1;

a subscription, i.e. unlimited use of the F1 function for a determined period of time.

a price depending on data outside the blockchain, such as an energy cost or data generated by an Oracle. It will be recalled that an Oracle is a service authorized to enter a datum into the blockchain at the request of a user.

In the case of a time slot, the cost of use may for example vary depending on the duration of the time slot or depending on its start time. The user may for example pay less for a time slot starting at night. This makes it possible to incite users of the F1 function to request its execution during a given period, to allow for server load. Thus, it is possible to smooth the executions over time and therefore to optimize the hardware architecture (memory, processors, etc.) of the servers.

Once the option has been chosen by the user (E24), the terminal will send a request to execute the function F3 to the device DCA. The function F3 is for example a payment function associated with the chosen tariff option. The device DCA will then execute (E25) the function F3 and make the payment using payment parameters (PAY_PARA) received beforehand. Alternatively, in the case where the payment is made a priori, the device may verify that the payment has indeed been made by virtue of payment parameters (PAY_PARA) received beforehand. These parameters may be banking information, information related to a proof of purchase or information related to the account of the user of the blockchain allowing a payment to be made or proof that a payment has been made to be provided. The payment process may be carried out outside the blockchain or else within it. In the case where the payment is made outside the blockchain, the device DCA will, for example, obtain a proof of purchase from a third party in order to determine whether the payment has been made.

Alternatively, the payment process may correspond to a sum being placed in escrow in anticipation of execution of the function F1 by the user terminal. The sum is then released when the function F1 is executed, the payment being made as a consequence.

According to one particular embodiment of the invention, the device DCA may send a response (E26) to the terminal TRM comprising the result of the payment or whether it was accepted (PAY_RESULT). The result is, for example, a status regarding the payment transaction (payment made or refused or pending) or indeed any other datum relating to the payment transaction (date, status, transaction number, financial institution, etc.).

According to one particular embodiment of the invention, the device DCA may obtain, from the blockchain, via the data of the publication called the tariff publication, the date on which the device DCA sent, to the terminal TRM, the tariff options of the function F1 (E22). Thus, in the case where the tariff option chosen by the terminal TRM is associated with a period of validity (2 days for example), the device DCA may verify that the offer is still valid before executing the function F3. This verification is conventionally carried out by comparing the date of receipt of the request E25 with the date of receipt of the request E22 plus the period of validity. If the date of request E25 is earlier then the tariff option is still valid and the device DCA may execute the function F3. Otherwise, an error message is sent to the terminal TRM, for example in step E26.

The device DCA may also publish, in the blockchain, information related to the receiving and sending steps (E25, E26), such as the date and time at which requests were received and sent, and received or sent elements such as, for example, the identifier of the terminal, information on execution of the function F3, or even the result of the function F3. This publication is called the "payment publication".

In step E30, the terminal TRM re-sends the request asking for execution of the function F1 to the device DCE. The request may be enriched, with respect to that sent in step E10, with additional data such as a payment transaction number or a counter value. On receipt of the request by the device DCE (E31), the latter will verify whether this request asking for execution of the function F1 by the terminal TRM is not the first. To do this, the device DCE may consult its history of received and sent requests in order to determine whether the request in question is the first. The device may also base its verification on parameters of the request such as the payment transaction number or the counter value. In the case of a counter value, it will be incremented by the terminal TRM when the request asking for the execution of the function F1 is re-sent.

If the request is not the first, the device DCE jumps to step E32 and sends a request to authorize use of the function F1 by the terminal TRM to the device DCA. This request for example comprises the identifier of the terminal TRM (ID_TRM) and the identifier of the function F1 (ID_F1). The device DCA will then obtain, for example from a private memory, the status of the payment (result of the execution of the function F3 or a proof of purchase) and deduce therefrom an access parameter of the function F1 (PARAC) for the terminal TRM.

The access parameter may also be dependent on other data, such as the date or time if the tariff offer chosen by the user is dependent on a time slot, but also on a value of a counter indicating the number of times the function F1 has already been executed if the tariff offer chosen by the user is dependent on a number of executions.

Alternatively, the device DCA may obtain the status of the payment from the blockchain.

This status may be obtained via the data of the publication called the payment publication, and recovery of a dedicated parameter, or indeed from information regarding the execution of the payment function.

The parameter PARAC may for example be a Boolean value that indicates, for example when it is set to 1, that the terminal TRM has authorization to execute the function F1. Alternatively, the parameter PARAC may be a character string or any other data set allowing a status to be provided in respect of whether the terminal TRM is authorized to execute the F1 function. Thus, the parameter PARAC may for example be a pair consisting of a Boolean value and a character string, the Boolean value giving information on whether the terminal TRM is authorized to execute the function F1 and the character string representing a notification such as an error code to be delivered if authorization should be denied.

In step E34, the device DCA will return a response to the device DCE comprising the access parameter PARAC, the identifier of the terminal TRM (ID_TRM) and the identifier of the function F1 (ID_F1).

The device DCA may also publish, in the blockchain, information related to the receiving and sending steps (E33, E34), such as the date and time at which requests were received and sent, and received or sent elements such as, for example, the identifier of the terminal, the access parameter PARAC, or even the result of a processing operation carried out by the device.

When the device DCE receives the response (E35), it will test (E37) the parameter PARAC. If the parameter PARAC indicates that execution of the function F1 by the terminal TRM is not authorized, then the device DCE sends the parameter PARAC to the terminal TRM. The terminal TRM is thus informed that execution is not possible and of the reason why execution is not possible. In contrast, if the parameter PARAC indicates that execution of the function F1 by the terminal TRM is authorized, then the device will execute the function F1 (E38) and send the result of the execution to the terminal TRM (E39).

The device DCE may also publish, in the blockchain, information related to the receiving steps (E31 and E35) and sending steps (E32, E36, E39), such as the date and time at which requests were received and sent, and received or sent elements such as, for example, the identifier of the terminal, the access parameter PARAC, information on execution of the function F1, or even the result of the execution of the function F1.

According to one particular embodiment of the invention, the function F1 may be executed outside the blockchain. In this case the device DCE will send the execution request to an external server via a dedicated interface of the blockchain.

According to one particular embodiment of the invention, the devices DCE and DCA may be one and the same computing machine executing a plurality of DApps implementing the functions F1, F2 and F3.

According to one particular embodiment of the invention (not described here), if execution of the function F1 fails, for example following an unavailability (memory problem, server/computer load problem, inter alia), then a request is sent from the device DCE to the device DCA comprising a parameter indicating that execution of the function F1 has failed, the identifier of the terminal TRM and the identifier of the function F1. The device DCA will then possibly provide, for example, a partial or complete refund of the sum paid beforehand in step E25.

According to one particular embodiment of the invention, the user may, via their terminal TRM and before step E10, consult a directory of functions in order to choose the function F1 to be executed. The directory may for example be represented in the terminal in the form of a list of functions or of a table of functions with for example a description, the name of the developer and a rating for each function, the rating for example being the result of an average, weighted by the degree of availability of the function, of the ratings given by users. The directory may for example be retrieved in response to a request sent by the terminal TRM to a DApp registered in a blockchain.

It goes without saying that the completely non-limiting embodiment that was described above was given purely by way of indication, and that many modifications may easily be made thereto by those skilled in the art without, however, departing from the scope of the invention.

The invention claimed is:

1. An access control method for controlling access to a function of an application, said method being implemented by a control device for controlling access to a function of an application, this control device being registered in a blockchain, the method comprising:
 a first act of receiving, from a first terminal, a first access request to access at least a first function of the application, said application being registered in said blockchain, said first request to access comprising at least a first identifier of said at least a first function and at least one identifier of said first terminal;
 an act of sending a response to the first request to access comprising at least one access parameter of said at least a first function and at least a second identifier of at least a second function registered in said blockchain, said at least a second identifier being associated with said at least one parameter;
 a second act of receiving, from at least a second terminal, a request to execute said at least a second function, said request to execute comprising at least said identifier of said first terminal;
 an act of executing said at least a second function; and
 a first act of publishing, in the blockchain, via a payment publication, said identifier of said first terminal, at least one datum associated with said second receiving act and at least one datum associated with a result of the execution of said at least a second function.

2. The access control method as claimed in claim 1, wherein the sending act is followed by a second act of publishing, in said blockchain, said identifier of said first terminal, at least one datum associated with the first act of receiving and at least one datum associated with the sending act.

3. The access control method as claimed in claim 1, wherein the first act of publishing act is followed by a second act of sending a response to the request to execute comprising at least one datum associated with the result of the execution of said at least a second function.

4. The access control method as claimed in claim 1, further comprising, following the first act of publishing:
 a third act of receiving, from said application, an authorization request to authorize use by said first terminal of said at least a first function, said authorization request comprising at least said identifier of said first terminal and at least said first identifier of said at least a first function;
 an act of obtaining, from said blockchain, depending on said identifier of said first terminal, data published via said payment publication;
 a third act of sending a response to the authorization request comprising at least a second access parameter of said at least a first function, said access parameter being dependent on the result of the execution of said at least a second function, which result is obtained via the data of said payment publication; and
 a third act of publishing, in the blockchain, said at least a second access parameter and the identifier of said first terminal.

5. An execution control method for controlling execution of a function of an application, said method being implemented by a device for controlling execution of a function of an application, this control device being registered in a blockchain, the method comprising:
 a first act of receiving, from a terminal, a first request to execute at least a first function of an application registered in said blockchain, said first request to execute comprising at least a first identifier of said at least a first function and at least one identifier of said terminal;
 a first act of sending a response to the first request to execute comprising at least a second identifier of at least a second function registered in said blockchain;
 a second act of receiving, from said terminal, a second request to execute said at least a first function, said second request to execute comprising at least said first identifier of said at least a first function and at least said identifier of said terminal;

a second act of sending an authorization request for said terminal to be authorized to execute said at least a first function, said authorization request comprising at least said identifier of said terminal and at least said first identifier of said at least a first function;

a third act of receiving a response to the authorization request comprising at least one access parameter of said at least a first function for said terminal;

an act of executing said at least a first function depending on said at least one received access parameter; and a first act of publishing, in the blockchain, said at least one access parameter, said identifier of said terminal and at least one datum associated with a result of the execution of said at least a first function.

6. The execution control method as claimed in claim 5, further comprising, following the first act of sending, a second act of publishing, in the blockchain, said identifier of said terminal, at least one datum associated with the first act of receiving and at least one datum associated with the first act of sending.

7. The execution control method as claimed in claim 5, wherein the first act of publishing is followed by a third act of sending a response to the second request to execute comprising at least one datum associated with the result of the execution of said at least a first function.

8. A device for controlling access to a function of an application, said control device being registered in a blockchain and comprising:

a processor; and a non-transitory computer readable medium comprising instructions stored thereon which when executed by the processor configure the device to implement a method comprising:

a first act of receiving, from a first terminal, a first request to access at least a first function of the application, said application being registered in said blockchain, said first request to access comprising at least a first identifier of said at least a first function and at least one identifier of said first terminal;

an act of sending a response to the first request to access comprising at least one access parameter of said at least a first function and at least a second identifier of at least a second function registered in said blockchain, said at least a second identifier being associated with said at least one parameter;

a first act of publishing, in said blockchain, said identifier of said first terminal, at least one datum associated with the first act of receiving and at least one datum associated with the first act of sending;

a second act of receiving, from at least a second terminal, a request to execute said at least a second function, said request to execute comprising at least said identifier of said first terminal;

an act of executing said at least a second function; and a second act of publishing, in the blockchain, via a payment publication, said identifier of said first terminal, at least one datum associated with said second receiving act and at least one datum associated with a result of the execution of said at least a second function.

9. The access control device as claimed in claim 8, wherein the instructions further configure the device to implement:

an act of receiving an authorization request to authorize use by said first terminal of said at least a first function, said authorization request originating from said application and comprising at least said identifier of said first terminal and at least said first identifier of said at least a first function;

an act of obtaining, from said blockchain, depending on said identifier of said first terminal, data published via said payment publication;

an act of sending a response to the authorization request comprising at least a second access parameter of said at least a first function, said access parameter being dependent on the result of the execution of said at least a second function, which result is obtained from the data of said payment publication;

an act of publishing, in the blockchain, said at least a second access parameter and said identifier of said first terminal.

10. A device for controlling execution of a function of an application, said control device being registered in a blockchain and comprising:

a processor; and a non-transitory computer readable medium comprising instructions stored thereon which when executed by the processor configure the device to implement a method comprising:

a first act of receiving, from a terminal, a first request to execute at least a first function of an application registered in said blockchain, said first request to execute comprising at least a first identifier of said at least a first function and at least one identifier of said terminal;

a first act of sending a response to the first request to execute comprising at least a second identifier of at least a second function registered in said blockchain;

a first act of publishing, in a blockchain, said identifier of said terminal, at least one datum associated with the first act of receiving and at least one datum associated with the first act of sending;

a second act of receiving, from said terminal, a second request to execute said at least a first function, said second request to execute comprising at least said first identifier of said at least a first function and at least said identifier of said terminal;

a second act of sending an authorization request for said terminal to be authorized to execute said at least a first function, said authorization request comprising at least said identifier of said terminal and at least said first identifier of said at least a first function;

a third act of receiving a response to the authorization request comprising at least one access parameter of said at least a first function for said terminal;

an act of executing said at least a first function depending on said at least one received access parameter; and a second act of publishing, in the blockchain, said at least one access parameter, said identifier of said terminal and at least one datum associated with a result of the execution of said at least a first function.

11. A non-transitory computer readable medium comprising a computer program stored thereon comprising instructions for implementing an access control method for controlling access to a function of an application when said program is executed by a processor of a control device which is registered in a blockchain, the method comprising:

a first act of receiving, from a first terminal, a first request to access at least a first function of the application, said application being registered in said blockchain, said first request to access comprising at least a first identifier of said at least a first function and at least one identifier of said first terminal;

an act of sending a response to the first request to access comprising at least one access parameter of said at least a first function and at least a second identifier of at least a second function registered in said blockchain, said at least a second identifier being associated with said at least one parameter;

a second act of receiving, from at least a second terminal, a request to execute said at least a second function, said request to execute comprising at least said identifier of said first terminal;

an act of executing said at least a second function; and an act of publishing, in the blockchain, via a payment publication, said identifier of said first terminal, at least one datum associated with said second act of receiving and at least one datum associated with a result of the execution of said at least a second function.

12. A non-transitory computer readable medium comprising a computer program stored thereon comprising instructions for implementing an execution control method for controlling execution of a function of an application, when said program is executed by a processor of a control device registered in a blockchain, the method comprising:

a first act of receiving, from a terminal, a first request to execute at least a first function of an application registered in said blockchain, said first request to execute comprising at least a first identifier of said at least a first function and at least one identifier of said terminal;

a first act of sending a response to the execution first request to execute comprising at least a second identifier of at least a second function registered in said blockchain;

a second act of receiving, from said terminal, a second request to execute said at least a first function, said second request to execute comprising at least said first identifier of said at least a first function and at least said identifier of said terminal;

a second act of sending an authorization request for said terminal to be authorized to execute said at least a first function, said authorization request comprising at least said identifier of said terminal and at least said first identifier of said at least a first function;

a third act of receiving a response to the authorization request comprising at least one access parameter of said at least a first function for said terminal;

an act of executing said at least a first function depending on said at least one received access parameter; and an act of publishing, in the blockchain, said at least one access parameter, said identifier of said terminal and at least one datum associated with a result of the execution of said at least a first function.

* * * * *